United States Patent
Aamer et al.

(10) Patent No.: US 9,643,131 B2
(45) Date of Patent: May 9, 2017

(54) HYDROPHILIC POROUS POLYTETRAFLUOROETHYLENE MEMBRANE (I)

(71) Applicant: PALL CORPORATION, Port Washington, NY (US)

(72) Inventors: Khaled Abdel-Hakim Helmy Aamer, Port Washington, NY (US); Hassan Ait-Haddou, Melville, NY (US); Marcin Stasiak, Port Washington, NY (US); Amarnauth Singh, Selden, NY (US)

(73) Assignee: Pall Corporation, Port Washington, NY (US)

( * ) Notice: Subject to any disclaimer, the term of this patent is extended or adjusted under 35 U.S.C. 154(b) by 131 days.

(21) Appl. No.: 14/815,554

(22) Filed: Jul. 31, 2015

(65) Prior Publication Data

US 2017/0028363 A1     Feb. 2, 2017

(51) Int. Cl.
    *B01D 71/80*      (2006.01)
    *B01D 71/72*      (2006.01)
    (Continued)

(52) U.S. Cl.
    CPC ......... *B01D 71/80* (2013.01); *B01D 67/0093* (2013.01); *B01D 71/36* (2013.01);
    (Continued)

(58) Field of Classification Search
    None
    See application file for complete search history.

(56) References Cited

U.S. PATENT DOCUMENTS

| | | |
|---|---|---|
| 4,136,237 A | 1/1979 | Takahashi et al. |
| 4,975,507 A | 12/1990 | Asrar |

(Continued)

FOREIGN PATENT DOCUMENTS

| | | |
|---|---|---|
| EP | 2767330 A2 | 8/2014 |
| WO | WO 93/15255 | 8/1993 |

(Continued)

OTHER PUBLICATIONS

U.S. Appl. No. 14/675,528, filed Mar. 31, 2015.

(Continued)

*Primary Examiner* — Krishnan S Menon
(74) *Attorney, Agent, or Firm* — Leydig, Voit & Mayer, Ltd.

(57) ABSTRACT

Disclosed are hydrophilic porous PTFE membranes comprising PTFE and an amphiphilic copolymer, for example, a copolymer of the formula:

(Continued)

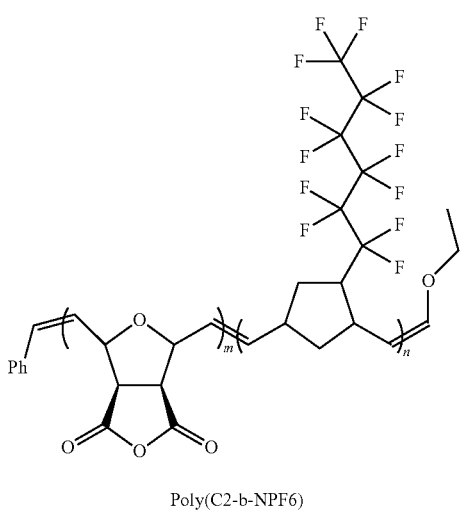

Poly(C2-b-NPF6)

Figure 1A:
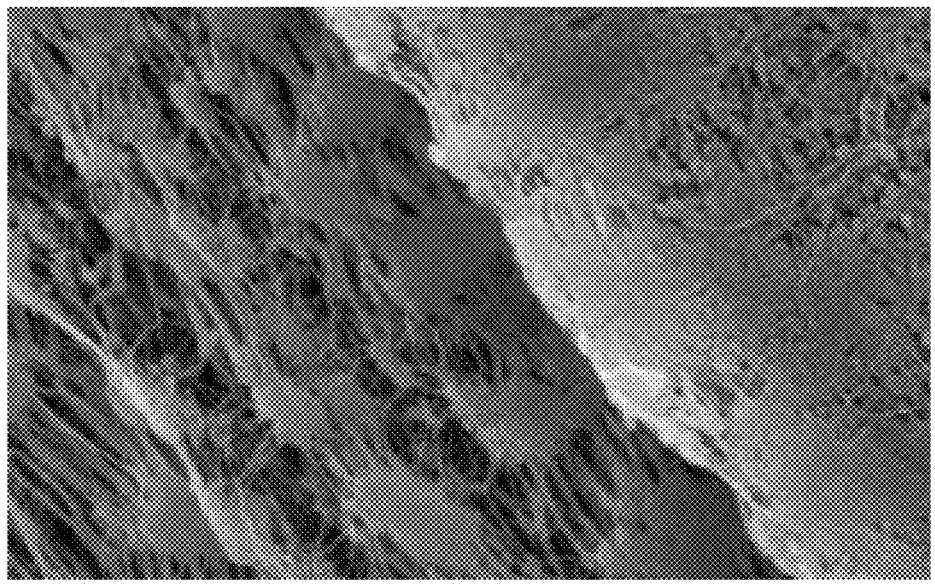

wherein m and n are as described herein. Also disclosed are a method of preparing hydrophilic porous PTFE membranes and a method of filtering fluids through such membranes.

7 Claims, 1 Drawing Sheet

(51) Int. Cl.
  *B01D 71/36* (2006.01)
  *B01D 67/00* (2006.01)
(52) U.S. Cl.
  CPC .......... *B01D 71/72* (2013.01); *B01D 2323/40* (2013.01); *B01D 2325/24* (2013.01)

(56) References Cited

U.S. PATENT DOCUMENTS

| | | | |
|---|---|---|---|
| 5,066,403 A | 11/1991 | Dutta et al. |
| 5,117,327 A | 5/1992 | Asrar et al. |
| 5,200,470 A | 4/1993 | Asrar |
| 5,218,049 A | 6/1993 | Yamamoto et al. |
| 5,219,662 A | 6/1993 | Grimminger et al. |
| 5,294,493 A | 3/1994 | Beckerbauer et al. |
| 5,418,277 A | 5/1995 | Ma et al. |
| 5,853,642 A | 12/1998 | Siedle et al. |
| 5,928,792 A | 7/1999 | Moya |
| 6,080,826 A | 6/2000 | Grubbs et al. |
| 6,126,825 A | 10/2000 | Shinagawa et al. |
| 6,303,725 B1 | 10/2001 | Chang et al. |
| 6,313,222 B1 | 11/2001 | Lin et al. |
| 6,436,476 B1 | 8/2002 | Sage, Jr. |
| 6,492,443 B1 | 12/2002 | Kodemura et al. |
| 6,653,424 B1 | 11/2003 | Sakamoto et al. |
| 6,677,418 B1 | 1/2004 | Feast et al. |
| 6,902,676 B2 | 6/2005 | Arcella et al. |
| 6,939,581 B2 | 9/2005 | Sanguineti et al. |
| 6,987,154 B2 | 1/2006 | Choi et al. |
| 7,232,917 B2 | 6/2007 | Sumida et al. |
| 7,336,857 B2 | 2/2008 | Kawahara et al. |
| 7,514,499 B2 | 4/2009 | Tam et al. |
| 8,143,369 B2 | 3/2012 | Fujiwara et al. |
| 8,223,472 B1 | 7/2012 | Dirk et al. |
| 8,283,410 B2 | 10/2012 | Musa |
| 8,410,290 B2 | 4/2013 | Fujiwara et al. |
| 8,431,625 B2 | 4/2013 | Luchterhandt et al. |
| 8,557,883 B2 | 10/2013 | Xu et al. |
| 8,678,203 B2 | 3/2014 | Knapp et al. |
| 8,883,925 B2 | 11/2014 | Kizu et al. |
| 9,441,078 B2 * | 9/2016 | Aamer ................... C08G 81/00 |
| 2008/0234451 A1 | 9/2008 | Kenwright et al. |
| 2009/0023877 A1 | 1/2009 | Liaw et al. |
| 2009/0030175 A1 | 1/2009 | Yamamoto et al. |
| 2009/0043059 A1 | 2/2009 | Liaw et al. |
| 2009/0182117 A1 | 7/2009 | Takeyama et al. |
| 2009/0264608 A1 | 10/2009 | Wakatsuki et al. |
| 2009/0269601 A1 | 10/2009 | Ishiguro et al. |
| 2009/0275719 A1 | 11/2009 | Ishiguro et al. |
| 2009/0306296 A1 | 12/2009 | Nanba et al. |
| 2010/0036074 A1 | 2/2010 | Aten et al. |
| 2010/0167100 A1 | 7/2010 | Moore et al. |
| 2011/0266220 A1 | 11/2011 | Campos et al. |
| 2012/0041137 A1 | 2/2012 | Musa et al. |
| 2012/0118816 A1 | 5/2012 | Gjoka et al. |
| 2012/0214940 A1 | 8/2012 | Hsu et al. |
| 2012/0245271 A1 | 9/2012 | Pawlow et al. |
| 2013/0030136 A1 | 1/2013 | Sunaga et al. |
| 2013/0281644 A1 | 10/2013 | Kiessling et al. |
| 2013/0292872 A1 | 11/2013 | Knapp et al. |
| 2014/0042090 A1 * | 2/2014 | Bell ................. B01D 67/0009 210/640 |
| 2014/0357820 A1 | 12/2014 | Stephen et al. |

FOREIGN PATENT DOCUMENTS

| | | |
|---|---|---|
| WO | WO 01/58577 | 8/2001 |
| WO | WO 2010/051150 A1 | 5/2010 |
| WO | WO 2011/038057 A1 | 3/2011 |

OTHER PUBLICATIONS

U.S. Appl. No. 14/675,547, filed Mar. 31, 2015.
U.S. Appl. No. 14/675,562, filed Mar. 31, 2015.
U.S. Appl. No. 14/675,585, filed Mar. 31, 2015.
U.S. Appl. No. 14/700,952, filed Apr. 30, 2015.
U.S. Appl. No. 14/675,592, filed Mar. 31, 2015.
U.S. Appl. No. 14/815,578, filed Jul. 31, 2015.
European Patent Office, Extended European Search Report issued in European Application No. 16173943.8, 6 pp. (Nov. 30, 2016).
Intellectual Property Office of Singapore, Search Report issued in Singapore Application No. 10201604718Q, 2 pp. (Aug. 10, 2016).

* cited by examiner

HYDROPHILIC POROUS POLYTETRAFLUOROETHYLENE MEMBRANE (I)

BACKGROUND OF THE INVENTION

The properties of porous PTFE membrane, including its mechanical strength, chemical resistance or inertness, non-adhesiveness, excellent dielectric property, thermal stability at high temperature and low coefficient of friction make it very attractive for various applications. However, for certain applications, it will be beneficial to improve its wetting characteristics without affecting its intrinsic properties. Efforts have been made to modify one or more properties of PTFE membranes. However, many of these efforts result in reduction in one or more of PTFE's attractive properties, for example, mechanical strength.

The foregoing shows that there exists an unmet need for preparing porous PTFE membranes with improved wetting characteristics without significantly affecting its mechanical strength.

BRIEF SUMMARY OF THE INVENTION

The present invention provides a hydrophilic porous membrane comprising a blend of polytetrafluoroethylene (PTFE) and an amphiphilic copolymer, wherein the amphiphilic copolymer comprises repeat units A and B, wherein A is selected from one or more of the following structures:

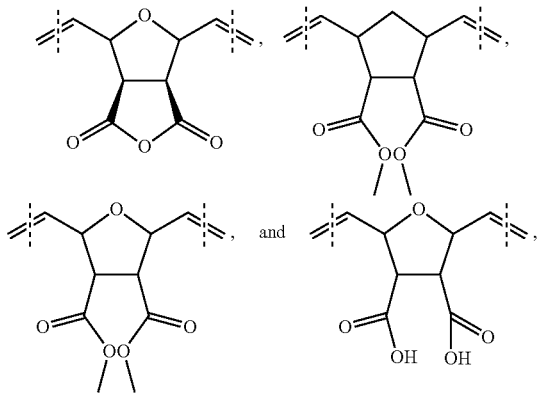

and B is of the formula:

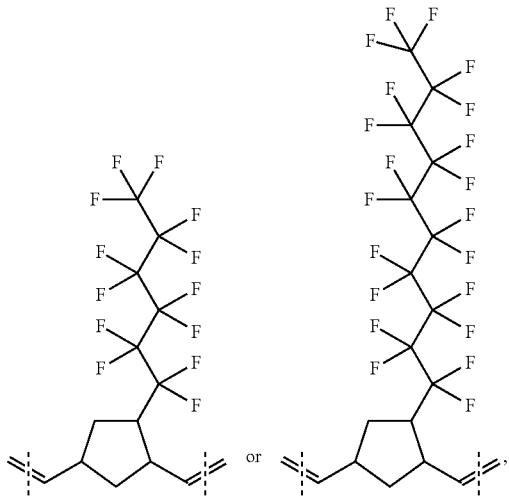

wherein:

the amphiphilic copolymer is a block copolymer or a random copolymer; and the number of repeat units of each of A and B are n and m, and range from 1 to about 1000, provided the sum of n and m is equal to or greater than 10.

The hydrophilic porous membranes share many of the advantages of PTFE membranes, for example, mechanical strength, and at the same time, exhibit high levels of water wettability.

The invention further provides a method of preparing a hydrophilic porous membrane comprising:

(i) preparing a blend comprising PTFE and an amphiphilic copolymer, optionally with a lubricant;

(ii) extruding the blend into a tape;

(iii) biaxially stretching the tape to obtain the hydrophilic porous membrane; optionally (iv) reacting the hydrophilic porous membrane with an agent to modify the chemical structure of the copolymer; and optionally (v) annealing the hydrophilic porous membrane;

wherein the amphiphilic copolymer comprises repeat units A and B, wherein A is selected from one or more of the following structures:

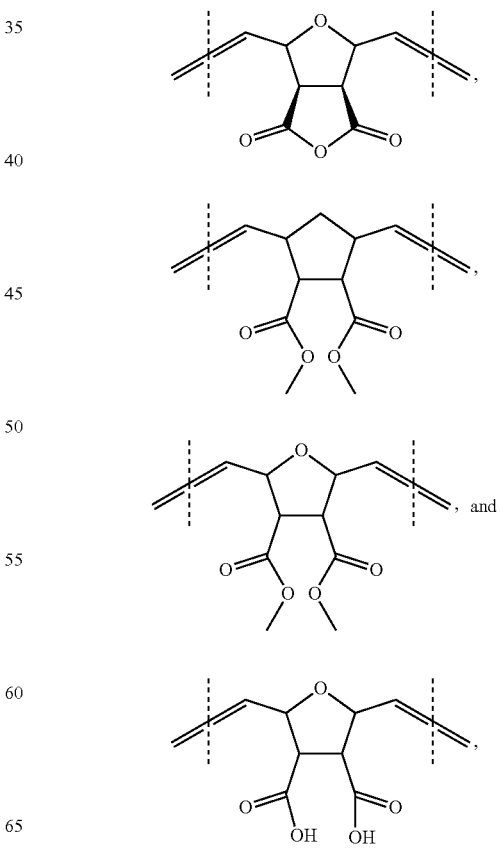

and B is of the formula:

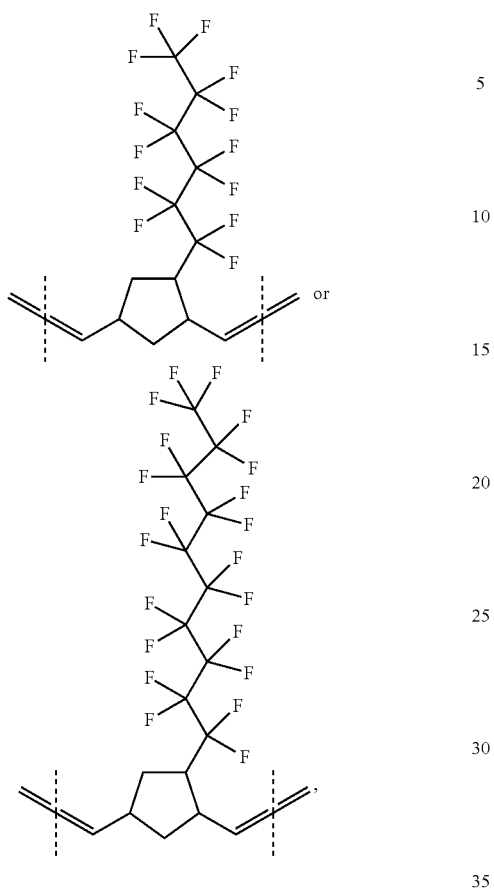

wherein:
the amphiphilic copolymer is a block copolymer or a random copolymer; and
the number of repeat units of each of A and B are n and m, and range from 1 to about 1000, provided the sum of n and m is equal to or greater than 10.

The invention further provides methods of filtering fluids through these hydrophilic porous PTFE membranes.

BRIEF DESCRIPTION OF THE SEVERAL VIEWS OF THE DRAWING(S)

Figure 1B:
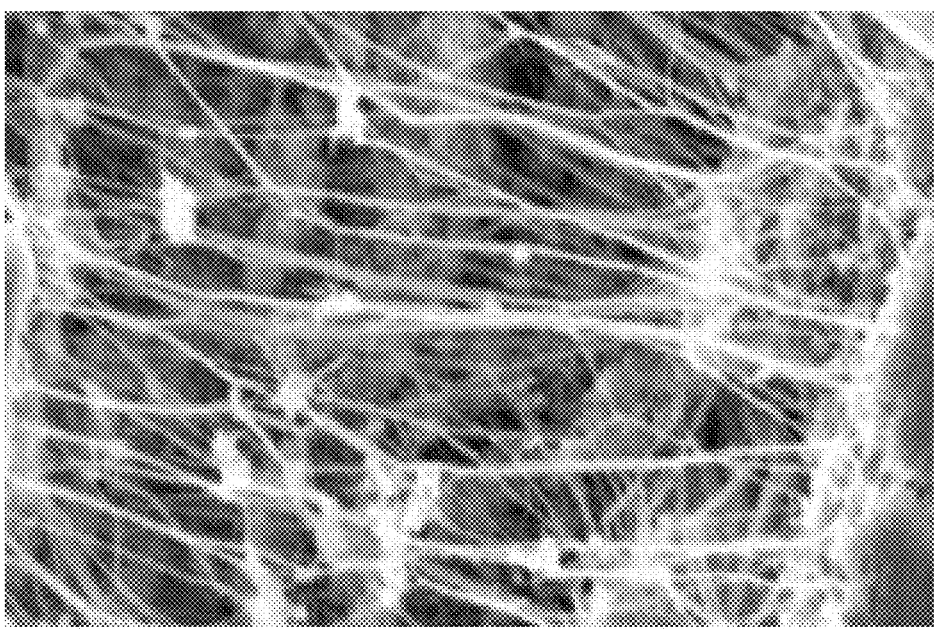

FIG. 1A depicts an SEM micrograph of the cross-section of a PTFE pre-form before stretching, and FIG. 1B depicts an SEM micrograph of the cross-section of the PTFE pre-form after stretching.

DETAILED DESCRIPTION OF THE INVENTION

In accordance with an embodiment, the invention provides a hydrophilic porous membrane comprising a blend of polytetrafluoroethylene (PTFE) and a amphiphilic copolymer, wherein the amphiphilic copolymer comprises repeat units A and B, wherein A is selected from one or more of the following structures:

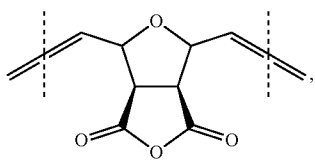

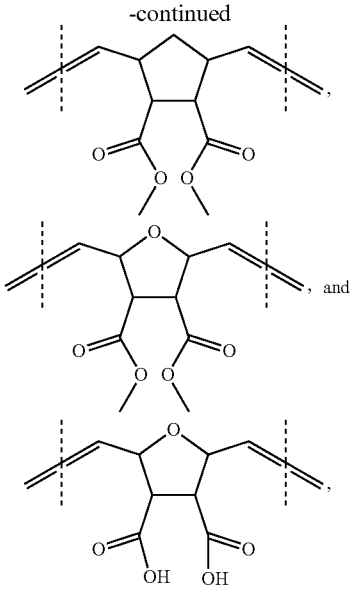

and B is of the formula:

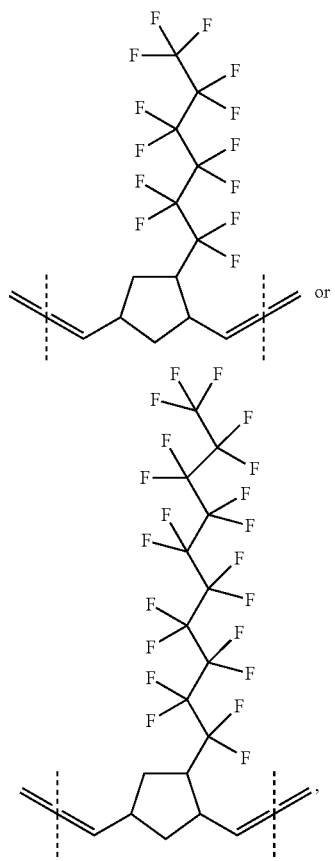

wherein:
the amphiphilic copolymer is a block copolymer or a random copolymer; and
the number of repeat units of each of A and B are n and m, and range from 1 to about 1000, provided the sum of n and m is equal to or greater than 10.

Dotted lines on the formulas of the repeat units indicate that the copolymer can be a block copolymer or a random copolymer. Block copolymer are indicated by parentheses: (repeat unit). Random copolymers are indicated by square brackets: [repeat unit].

In embodiments, n and m represent the degrees of polymerization of the respective monomers, and are independently from about 10 to about 1000, preferably from about 20 to about 50.

In other embodiments, n and m represent the mole fraction of the monomers present in the copolymer and n and m can independently range between 1 to 99 mole %, preferably 20 to 50 mole %.

The respective monomer blocks can be present in the block copolymer in any suitable mass %, for example, in an embodiment, from about 99%: about 1% to about 50%: about 50%, preferably from about 90%: about 10% to about 70%: about 30%, and more preferably from about 75%: about 25%.

The copolymer can be a block copolymer or a random copolymer. The block copolymer can be a diblock (A-B), triblock (A-B-A or B-A-B), or multiblock copolymer ((A-B)x). Optionally, the copolymer can have a third segment C, for example, a triblock copolymer or a random copolymer such as A-B-C.

The copolymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

In accordance with an embodiment, the amphiphilic copolymer has one of the following formulae:

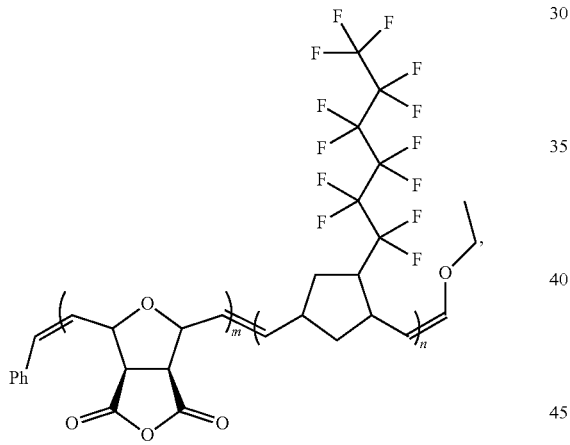

Poly(C2-b-NPF6)

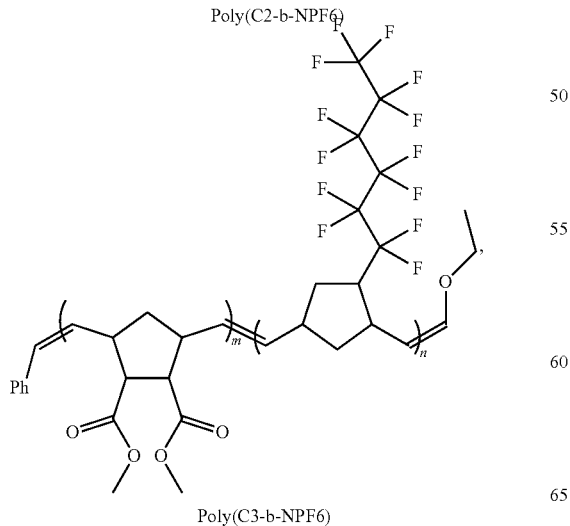

Poly(C3-b-NPF6)

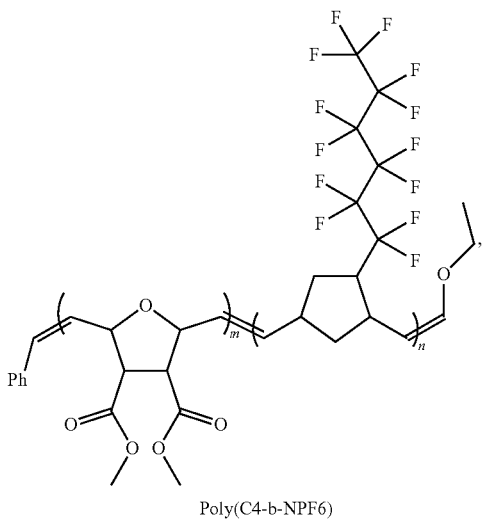

Poly(C4-b-NPF6)

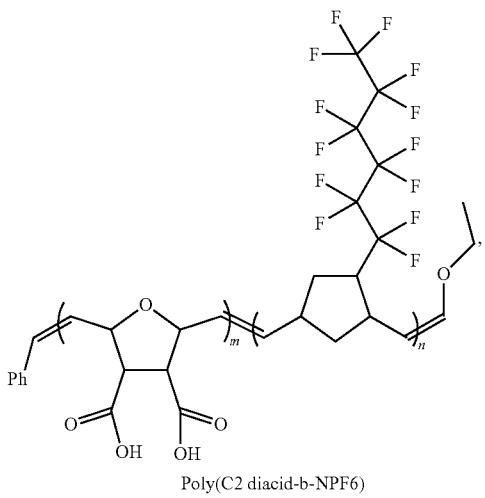

Poly(C2 diacid-b-NPF6)

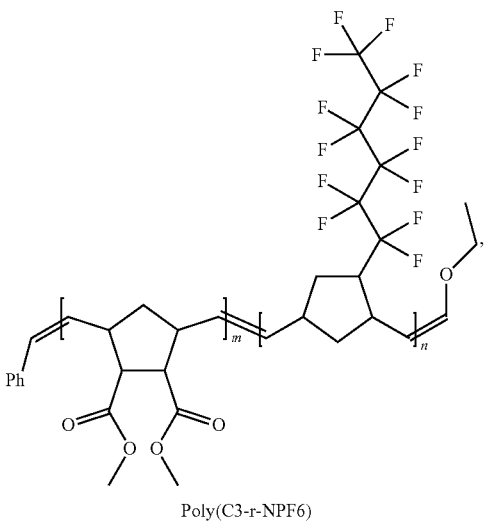

Poly(C3-r-NPF6)

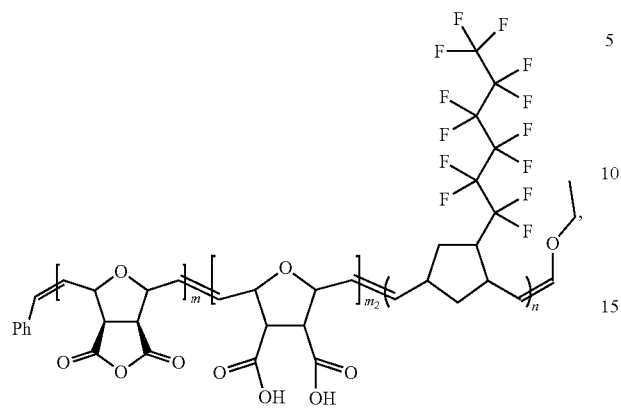

wherein $m_1+m_2=m$.

The amphiphilic copolymers of the invention can be prepared by any suitable method, for example, through ring opening metathesis polymerization (ROMP) of cyclic monomers. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

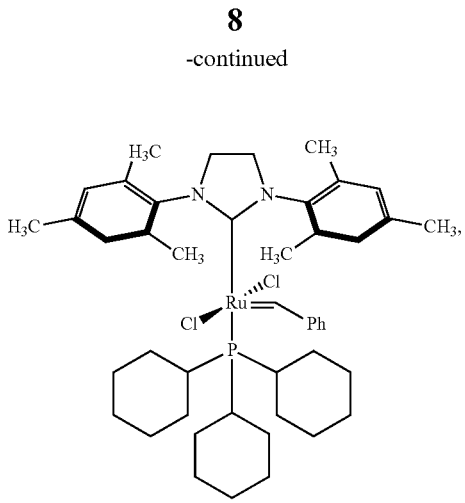

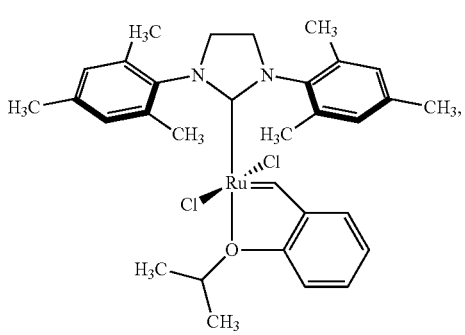

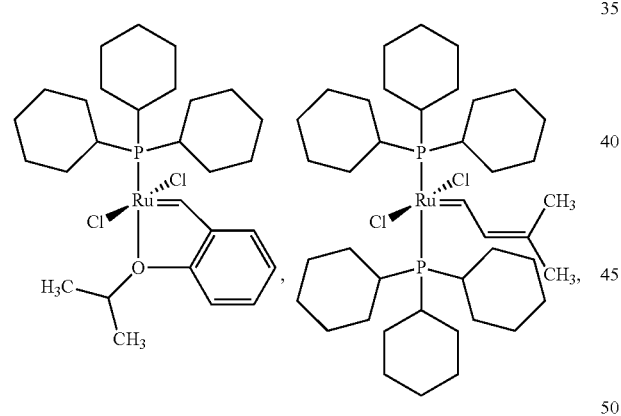

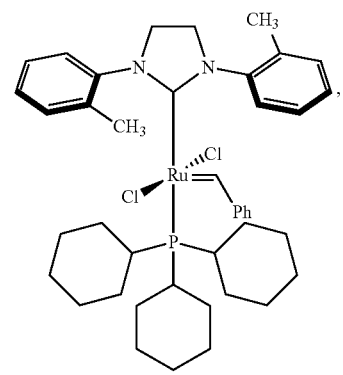

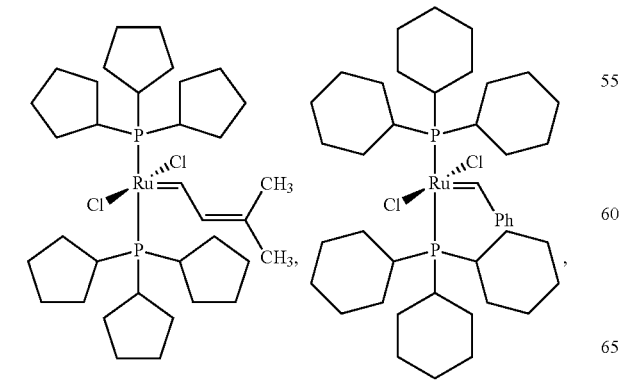

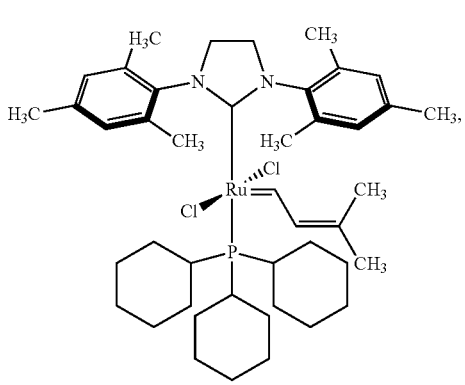

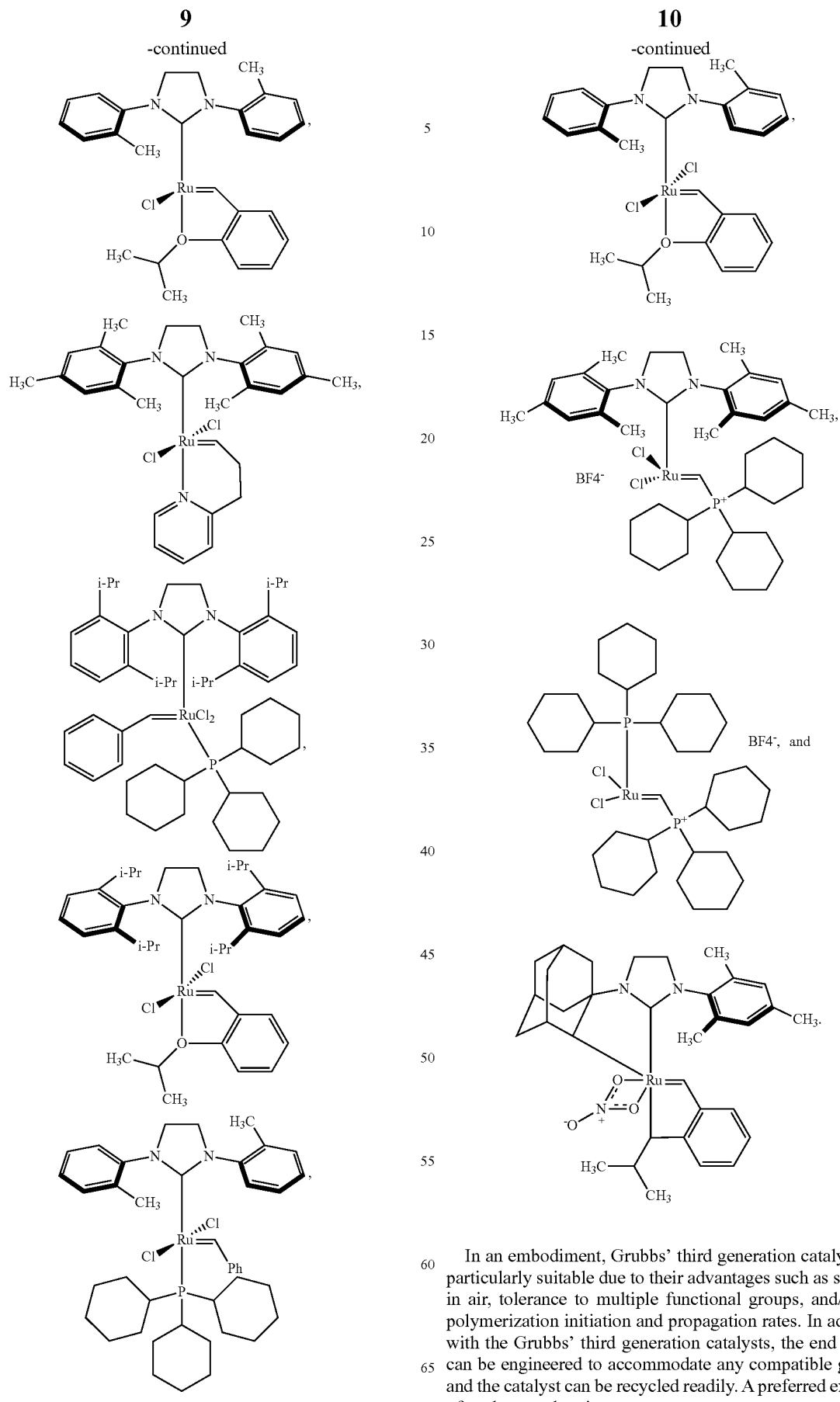

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

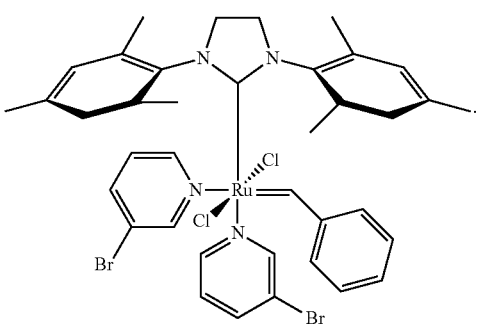

The above third generation Grubbs catalyst (G3) may be obtained commercially or prepared from a Grubbs second generation catalyst (G2) as follows:

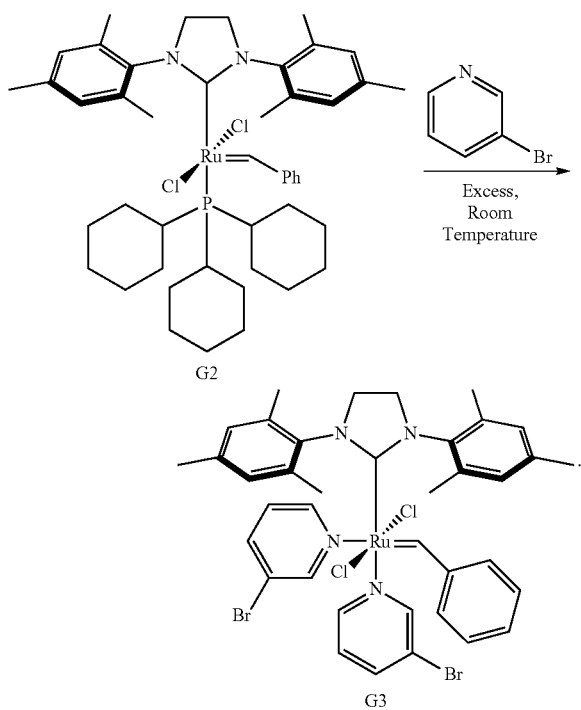

The block copolymer having segment A selected from:

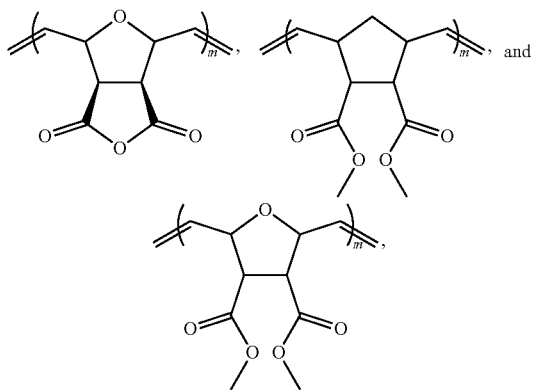

can be prepared by a method comprising:
(i) polymerizing a monomer selected from cis-5-oxanorbornene-exo-2,3-dicarboxylic anhydride, dimethyl ester of cis-5-norbornene-exo-2,3-dicarboxylic acid, and dimethyl ester of cis-5-oxanorbornene-exo-2,3-dicarboxylic acid, catalyzed by a ring opening metathesis polymerization (ROMP) catalyst to obtain a homopolymer; and
(ii) sequentially polymerizing on a chain end of the homopolymer obtained in (i) 5-(perfluorohexyl)norbornene catalyzed by a ROMP catalyst.

The copolymer prepared from cis-5-oxanorbornene-exo-2,3-dicarboxylic anhydride (Poly(C2-b-PNF6)) can be reacted with an aqueous base to obtain a copolymer having segment A with dicarboxylic acid,

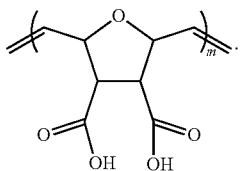

A random copolymer can be prepared by a method comprising polymerizing (i) a mixture of dimethyl ester of cis-5-norbornene-exo-2,3-dicarboxylic acid and 5-(perfluorohexyl)norbornene catalyzed by a ROMP catalyst or (ii) a mixture of dimethyl ester of cis-5-oxanorbornene-exo-2,3-dicarboxylic acid, 5-(perfluorohexyl)norbornene, and N-mercaptoethyl cis-5-norbornene-exo-2,3-dicarboxylimide catalyzed by a ROMP catalyst.

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

To prepare a block copolymer, for example, the polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

The polymers can be isolated by a suitable technique, for example, precipitation with a nonsolvent.

The copolymers can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multiangle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The copolymers are preferably monodisperse. For example, the copolymers have an Mw/Mn of 1.05 to 1.5, preferably 1.1 to 1.2.

For example, a copolymer of the formula:

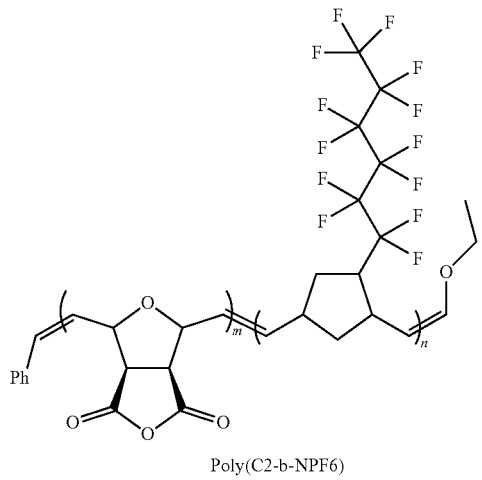

Poly(C2-b-NPF6)

can be prepared by a method comprising:

(i) polymerizing cis-5-oxanorbornene-exo-2,3-dicarboxylic anhydride catalyzed by a ring opening metathesis polymerization (ROMP) catalyst to obtain a homopolymer; and (ii) polymerizing on a chain end of the homopolymer obtained in (i) 5-(perfluorohexyl)norbornene catalyzed by a ROMP catalyst, as illustrated below:

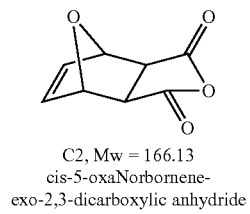

C2, Mw = 166.13
cis-5-oxaNorbornene-exo-2,3-dicarboxylic anhydride

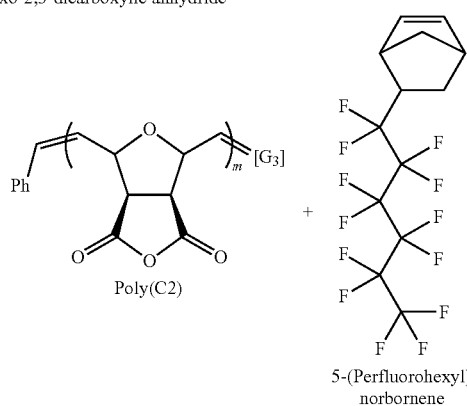

Poly(C2)

5-(Perfluorohexyl)norbornene

-continued

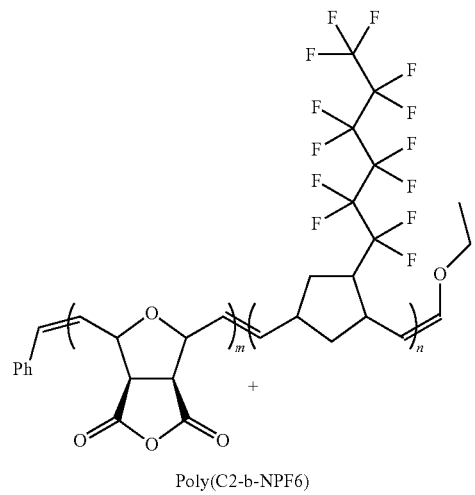

Poly(C2-b-NPF6)

Poly(C2 diacid-b-NPF6) can be prepared by hydrolyzing Poly(C2-b-PNF6) with an aqueous base, as illustrated below:

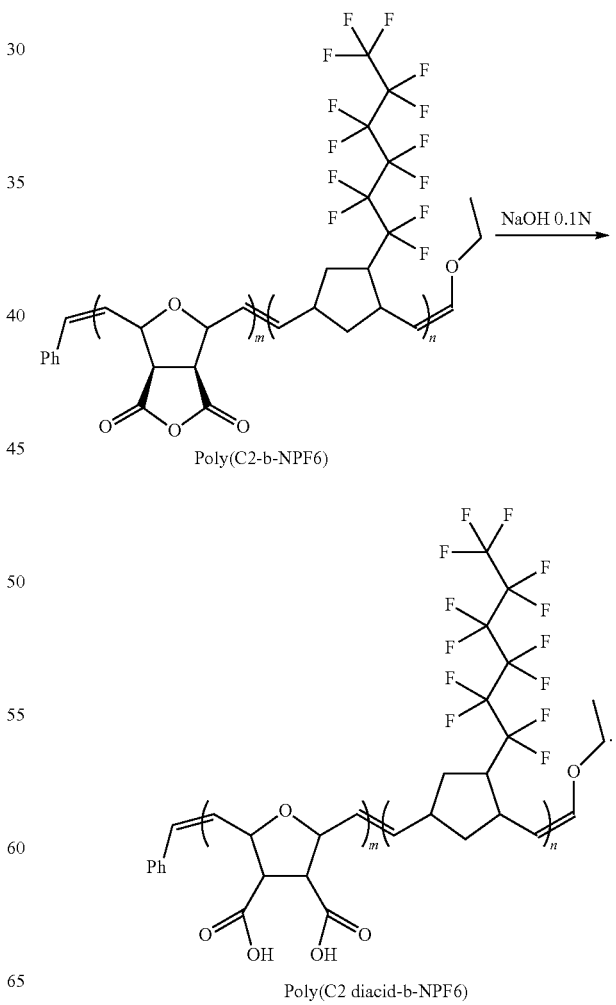

Poly(C3-b-NPF6) can be prepared by a method comprising:

(i) polymerizing dimethyl ester of cis-5-norbornene-exo-2,3-dicarboxylic acid catalyzed by a ring opening metathesis polymerization (ROMP) catalyst to obtain a homopolymer; and (ii) polymerizing on a chain end of the homopolymer obtained in (i) 5-(perfluorohexyl)norbornene catalyzed by a ROMP catalyst, as illustrated below:

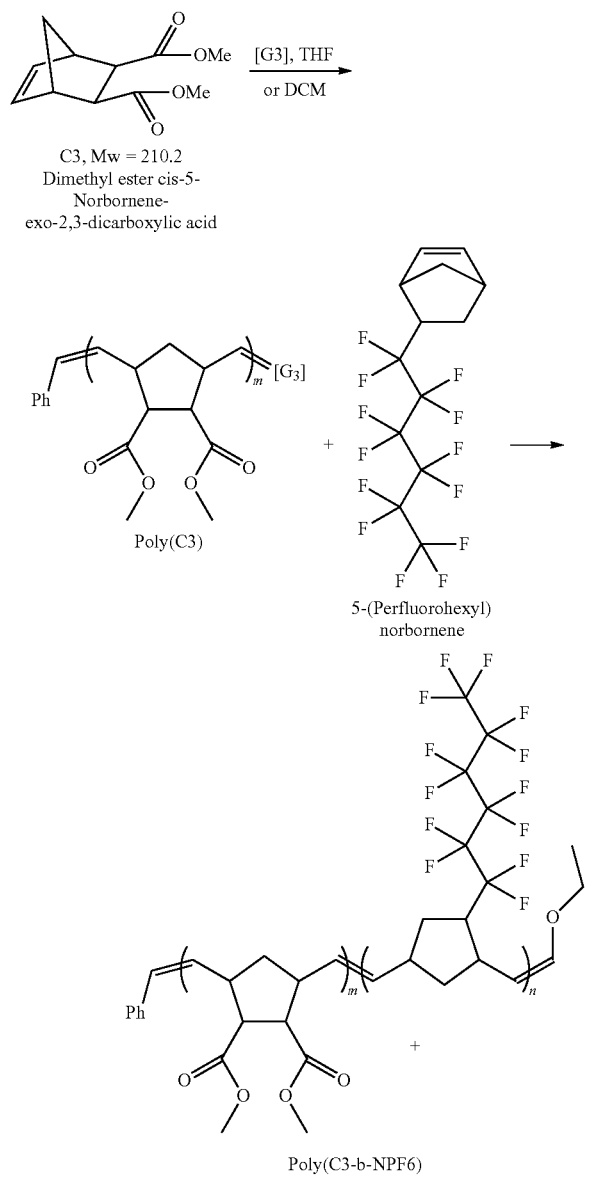

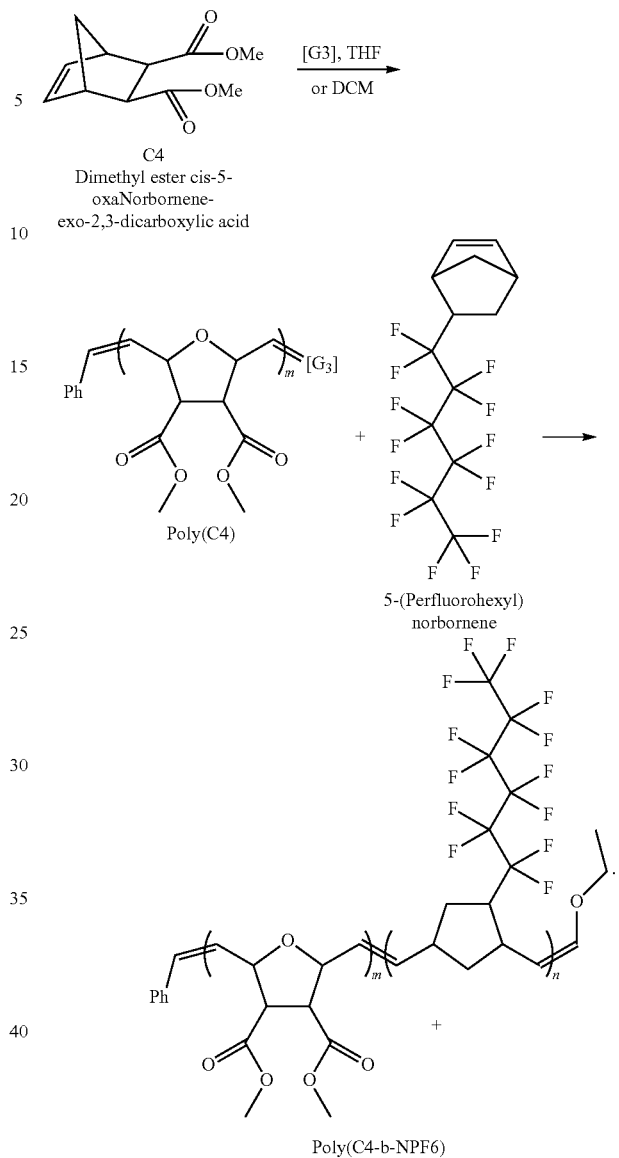

Poly(C4-b-NPF6) can be prepared by a method comprising:

(i) polymerizing dimethyl ester of cis-5-oxanorbornene-exo-2,3-dicarboxylic acid catalyzed by a ROMP catalyst to obtain a homopolymer; and (ii) polymerizing on a chain end of the homopolymer obtained in (i) 5-(perfluorohexyl)norbornene catalyzed by a ROMP catalyst Poly(C3-r-NPF6) can be prepared by a method comprising polymerizing a mixture of dimethyl ester of cis-5-norbornene-exo-2,3-dicarboxylic acid and 5-(perfluorohexyl)norbornene catalyzed by a ROMP catalyst.

In the above methods, polymerization can be terminated in a suitable manner, for example, by the use of alkyl vinyl ether such as ethyl vinyl ether. Thus, one of the end groups of the copolymers can be provided.

The other of the end groups can be provided by choosing an appropriate ROMP catalyst. For example, a phenyl end group can be provided by the use a ROMP catalyst having a benzylidenyl group on the transition metal.

The present invention further provides a method of preparing a hydrophilic porous PTFE membrane comprising:

(i) preparing a blend comprising PTFE and a amphiphilic copolymer, optionally with a lubricant;

(ii) extruding the blend into a tape;

(iii) biaxially stretching the tape to obtain the hydrophilic porous membrane; optionally (iv) reacting the hydrophilic porous membrane with an agent to modify the chemical structure of the copolymer; and optionally (v) annealing the hydrophilic porous membrane;

wherein the amphiphilic copolymer comprises repeat units A and B, wherein A is selected from one or more of the following structures:

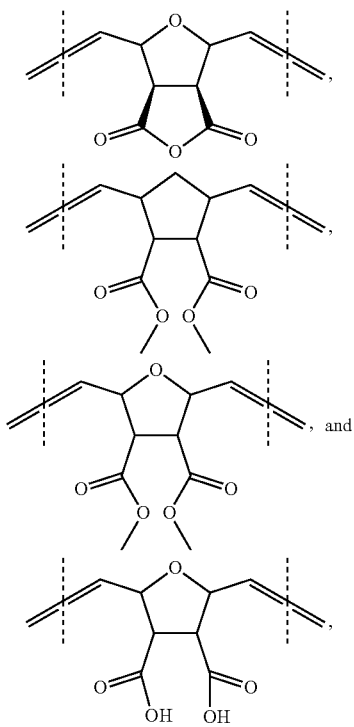

and B is of the formula:

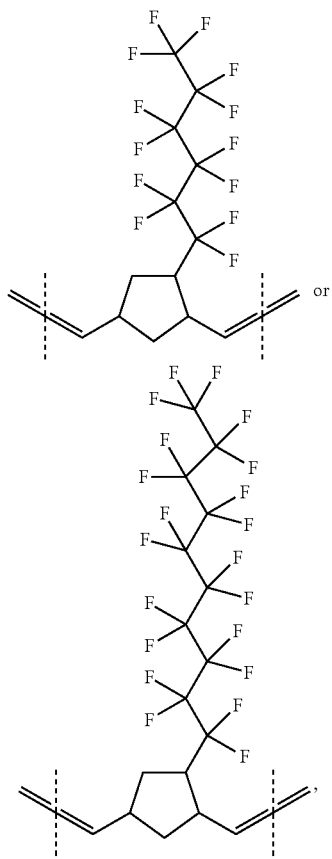

wherein:
the amphiphilic copolymer is a block copolymer or a random copolymer; and
the number of repeat units of each of A and B are n and m, and range from 1 to about 1000, provided the sum of n and m is equal to or greater than 10.

The required amount of a PTFE powder is mixed with a solution of the copolymer in a suitable solvent, for example, an alcohol solvent such as methanol, ethanol, or isopropanol, to obtain a blend, which is then mixed with a lubricant such as odorless mineral spirits, e.g., Isopar G, and the resulting paste is subjected to shear, for example, in a twin roller, and formed into a billet under a pressure of about 300 psi or more, at least twice, each for a period of about 55 sec. The resulting billets are equilibrated at room temperature for about 12 hrs or more. The billets are then extruded into the desired shape. For example, extrusion is performed at 26 mm die gap size, maximum pressure and constant temperature of 55° C. resulting in a tube shaped PTFE tape. Next, the tube shaped tape is cut open along the central axis and re-rolled around a pipette, resulting in a new billet (non-compressed). The new billet is re-extruded at the same conditions as used during first extrusion process. This step is added to provide advantageous cross-directional mechanical properties to the PTFE tape. Calendaring is performed at 30° C. targeting a tape thickness of 9-10 mils and cut into 4×4". The resulting tape is then dried at 125° C. for 1 h, whereby the lubricant is removed from the extruded tape.

The tape is then stretched at the following conditions: Stretch ratio of machine direction (MD) and transverse direction (TD) is 3 at 300%/sec stretch rate. Temperature in the stretch oven is set to 150° C.

The stretched tape is then annealed. Annealing is conducted in the annealing oven at 350° C. for 5 sec, following which the tape is cooled. The porosity that is produced by the above stretching steps is retained upon cooling.

Optionally, the porous membrane obtained above is reacted with a base to ring open any anhydride units present in the copolymer. The base can be an amine or alkali. In an embodiment, the amine can be a polyether monoamine such as polyethylene oxide monoamine, polypropylene oxide monoamine, or a polyethylene oxide-co-polypropylene oxide monoamine. An example of a polyether monoamine is JEFFAMINE® M1000, available from Huntsman Corporation, which is a monoamine of approximately 1000 molecular weight with a PO/EO ratio of 3/19. Alternatively, the polyether amine can be polyether diamine. An example of a polyether diamine is JEFFAMINE® ED176, also available from Huntsman Corporation, which is a diamine with a predominantly polyethylene oxide backbone.

Thus, for example, a solution of the amine in an organic solvent such as tetrahydrofuran (THF) at a concentration of about 5 to 10% (w/w) is prepared. Porous membrane samples are immersed in the amine solution for a suitable period of time, e.g., about 30 minutes to about 2 hours, particularly about 1 hour. The amine solution can be contacted with the membrane at any suitable temperature, for example, room temperature (20-25° C.). The amine treated samples are allowed to dry for a suitable period of time, for example, 30 seconds to 1 minute, until the samples are not transparent any more. The resulting membrane is heat cured in an oven at a temperature of about 160° C. for a period of about 30 min. The resulting membrane is soaked in excess THF for a suitable period of time, e.g., 12-16 hours, following which the membrane is washed with fresh THF and dried at about 50° C. for a period of about 30 minutes.

Further optionally, the resulting membrane can be treated with 1N NaOH solution followed by rinsing with deionized water and subsequently air dried. Alternatively, or in addition, the membrane can be exposed to water at a temperature of 80° C. or higher.

In accordance with an embodiment of the invention, the hydrophilic porous PTFE membrane is a porous membrane, e.g., a nanoporous membrane, for example, a membrane having pores of diameter between 1 nm and 100 nm, or a microporous membrane having pores of diameter between 1 μm and 10 μm.

The surface tension of the resulting porous membrane can be determined as follows. For example, a sheet of PTFE porous support is coated at room temperature by pre-wetting the membrane sheet with IPA solvent and soaking the membrane in a coating polymer solution with concentration that ranges between 0.1% and 10% by mass. The coating time ranges between (1 min to 12 hours). After soaking the support, it is dried in convection oven at 100° C. to 160° C. The drying time ranges between (10 minutes to 12 h). The resulting porous PTFE membrane's wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solution's surface tension ranges from 25 to 92 dyne/cm in small non-equivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

Hydrophilic porous PTFE membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, the porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

In accordance with embodiments of the invention, the hydrophilic porous PTFE membrane can have a variety of configurations, including planar, flat sheet, pleated, tubular, spiral, and hollow fiber.

Hydrophilic porous PTFE membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The present invention further provides a hydrophilically modified porous PTFE membrane produced by the method described above.

The present invention further provides a method of filtering a fluid, the method comprising passing the fluid through the hydrophilic porous PTFE membranes described above.

The following examples further illustrate the invention but, of course, should not be construed as in any way limiting its scope.

EXAMPLE 1

Materials: The following materials were purchased and used as received.

Dimethyl 5-norbornene-2,3-dicarboxylate (C3) was purchased from Alfa Aesar,

Dichloromethane (DCM) was stored over activated Alumina and purged with Argon before use, Isopropyl alcohol (IPA), dicyclopentadiene (DCPD), 1H,1H,2H-Perflouro-1-octene (PF6), 1H,1H,2H-Perflouro-1-dodecene (PF10), toluene, thionyl chloride, ethylacetate, dimethylformamide (DMF), maleimide, furan, diisopropylazodicarboxylate (DIAD), triphenylphosphine (Ph₃P), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use. Cyclooctadiene (COD) was purified by vacuum distillation from boron trifluoride and used fresh.

EXAMPLE 2

This example illustrates the preparation of dichloro[1,3-bis(2,4,6-trimethylphenyl)-2-imidazolidinylidene](benzylidene)bis(3-bromopyridine)ruthenium(II) (G3) catalyst.

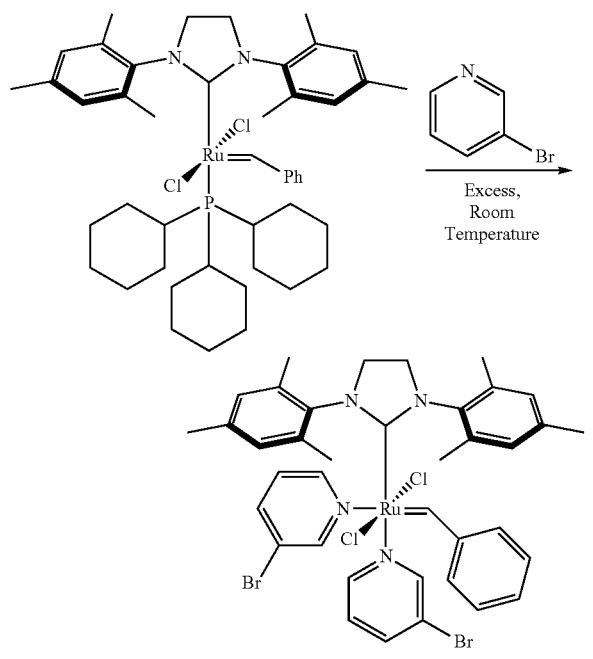

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

EXAMPLE 3

This example illustrates the gel permeation chromatographic characterization of the homopolymer and copolymers in accordance with an embodiment of the invention.

The homopolymer and block copolymer obtained were characterized for their molecular weight and molecular weight distribution properties by the MALS-GPC technique under the following conditions:
Mobile phase: Dichloromethane (DCM).
Mobile phase temperature: 30° C.
UV wavelength: 245 nm.

Columns used: three PSS SVD Lux analytical columns (styrene-divinylbenzene copolymer network), columns having as stationary phase beads of diameter 5 μm and pore sizes of 1000 A, 100,000 A, and 1,000,000 A, and guard columns.

Flow rate: 1 mL/min.

GPC system: waters HPLC alliance e2695 system with UV and RI detectors

MALS system: The DAWN HELEOS 8 system with 8 detectors operating a laser at 664.5 nm.

EXAMPLE 4

This example illustrates a procedure to prepare NPF6 monomer in accordance with an embodiment of the invention.

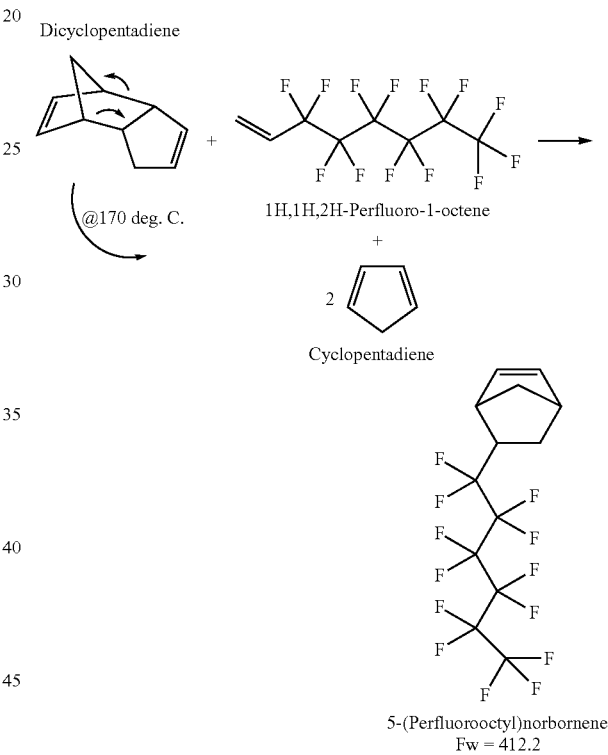

A Parr high pressure reactor cylinder vessel was charged with DCPD (100 ml, 737 mmol), PF6 (168 ml, 737 mmol) and the cylinder was attached to the reactor, and hydroquinone (2.43 g, 22.1 mmol), heated to 170° C. for 72 hours. The reaction content was dissolved into 150 ml DCM and transferred into 500 ml round bottom flask to purify the monomer by vacuum distillation.

$^1$H-NMR (CDCl₃): δ (ppm) 6.2-6.0 (2H), 3.2 (1H), 3.0 (1H), 2.8 (1H), 2.0 (1H), 1.5 (1H), and 1.2-1.4 (2H).
$^{19}$F-NMR (CDCl₃): δ −89.9 (s), −112.6 (m), −123.8 to −121.3 (m), −127.1 to −125.3 (m).

EXAMPLE 5

This example illustrates a procedure to prepare NPF10 monomer in accordance with an embodiment of the invention.

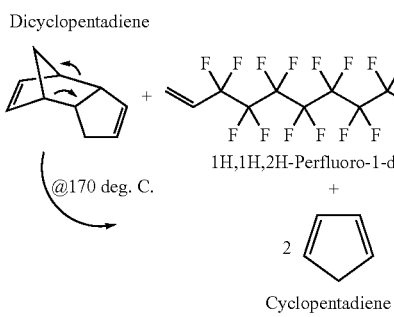

Dicyclopentadiene 1H,1H,2H-Perfluoro-1-dodecene

@170 deg. C.

2

Cyclopentadiene

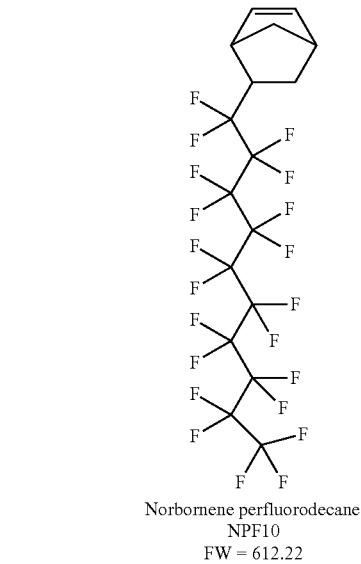

Norbornene perfluorodecane
NPF10
FW = 612.22

A Parr high pressure reactor cylinder vessel was charged with DCPD (24.6 ml, 183 mmol), PF6 (132 ml, 370 mmol) and the cylinder was attached to the reactor, and hydroquinone (1.08 g, 10 mmol), heated to 170° C. for 72 hours. The reaction content was dissolved into 150 ml DCM and transferred into 500 ml round bottom flask to purify the monomer by vacuum distillation.

$^1$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H). $^{19}$F-NMR (CDCl$_3$): δ −80.9 (s), −112.6 (m), −123.8 to −121.4 (m), −127.2 to −125.5 (m).

EXAMPLE 6

This example illustrates a procedure to prepare C2 monomer in accordance with an embodiment of the invention.

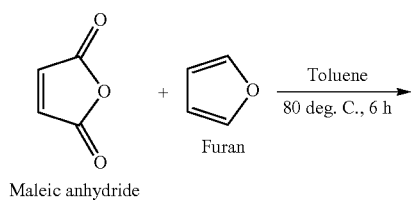

Maleic anhydride  Furan

Toluene
80 deg. C., 6 h

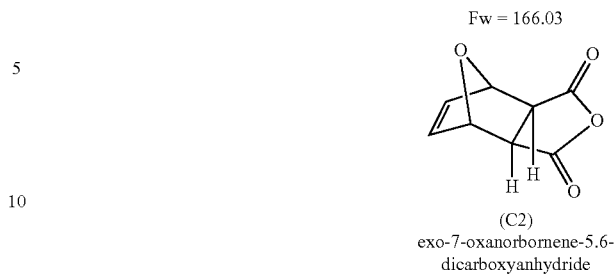

Fw = 166.03

(C2)
exo-7-oxanorbornene-5,6-dicarboxyanhydride

In a clean 2 L round bottom flask (RBF) equipped with magnetic stirring bar, furan (390 ml, 3.35 mol) was added to a solution of maleic anhydride (350 g, 3.57 mol) in 1.5 L of toluene. The mixture was heated at 80° C. for 6 h. C2 was obtained as white precipitate from the solution upon washing with toluene (200 mL, 3×) and filtration. The white solid was dried under vacuum at room temperature for 24 h. C2 was obtained as a pure exo-isomer in yield of 650 g, 95%. $^1$H-NMR (300 MHz, DMSO): δ (ppm) 6.6 (s, 2H), 5.4 (s, 2H), 3.15 (s, 2H).

EXAMPLE 7

This example illustrates a procedure to prepare a C4 monomer, which is a dimethyl ester of the C2 monomer, in accordance with an embodiment of the invention.

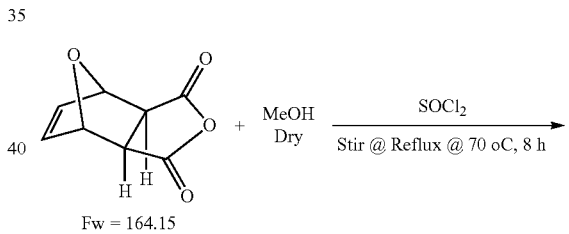

Fw = 164.15

MeOH
Dry

SOCl$_2$
Stir @ Reflux @ 70 oC, 8 h

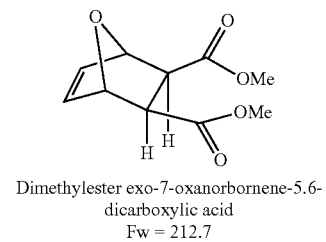

Dimethylester exo-7-oxanorbornene-5,6-dicarboxylic acid
Fw = 212.7

To 500 ml RBF, exo-7-oxanorbornene-5,6-dicarboxyanhydride (C2) (65 g, 0.4 mol) was dissolved in methanol (750 ml), thionyl chloride (25 ml) was added to the C2 solution slowly drop wise to form a yellow solution. The solution was refluxed for 48 hours after which the solvent was removed till dryness and to obtain the monomer. The solid was dissolved in ethyl acetate, washed with K$_2$CO$_3$ solution (200 ml, 2×), washed with DI water (200 ml, 2×) and dried over MgSO$_4$. The resulting yellow solution was concentrated to give the C4 monomer. $^1$H-NMR (CDCl$_3$): δ (ppm) 6.49 (s, 2H), 5.2 (s, 2H), 3.8 (s, 2H) 3.7 (s, 6H), 2.8 (s, 2H).

EXAMPLE 8

This example illustrates the synthesis and properties of copolymer Poly(C2-b-NPF6) in accordance with an embodiment of the invention.

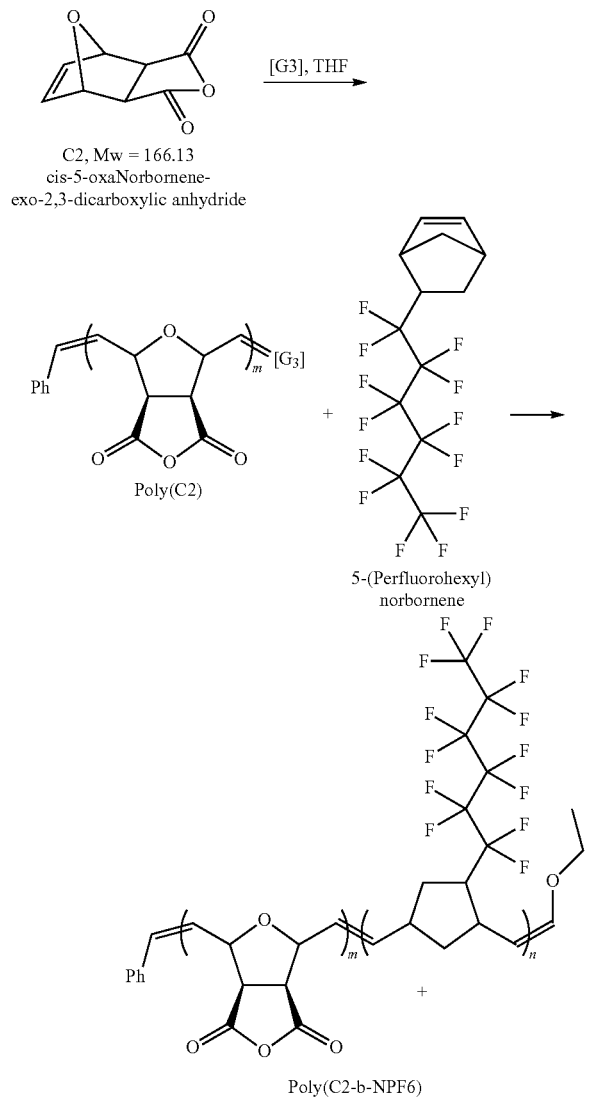

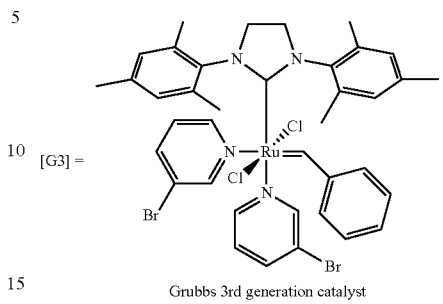

Grubbs 3rd generation catalyst

Grubbs $3^{rd}$ generation (G3) catalyst (22 mg, 0.025 mmol) was weighed in 40 mL vial with equipped with fluoropolymer resin-silicone septa open-top cap. G3 was dissolved in Argon degassed THF (60 mL) and transferred via cannula to clean 1 L RBF equipped with stirring bar. A solution of C2 monomer (3.05 g, 18.4 mmol) in THF (86 mL) was degassed with Argon gas and transferred into the G3 solution and stirred for 30 minutes. A solution of NPF6 monomer (1.03 g, 2.5 mmol) in THF (208 mL) was degassed with Argon gas and transferred into the growing Poly(C2) block solution and was stirred for another 60 minutes. Ethylvinylether (2 mL) was then added to the yellow solution of the diblock copolymer to terminate the reaction. The polymer was precipitated in MeOH (2 L, 2×) to recover the white solid of pure polymer. The resulting polymer was filtered and dried under vacuum at room temperature, yield (4.0 g, 98%).

$^1$H-NMR (300 MHz, DMSO): δ (ppm) 12.25 (s), 5.5 to 6.0 (m), 4.75 to 5.25 (s), 4.5 to 4.75 (s), 3.75 (s), 3.3 (s), 3.25 (s).

Elemental Analysis data are set forth in Table 1 below.

TABLE 1

| | | Elemental Analysis | | | | | | | | | |
|---|---|---|---|---|---|---|---|---|---|---|---|
| | | | | | | | | | | Mole % | |
| Polymer Acronym | Elemental Analysis | Theoretical (w %) | | | Actual (w %) | | | F-block w % | Hydrophilic w % | F-block % | Hydrophilic % |
| | | C % | H % | F % | C % | H % | F % | | | | |
| Poly(C2-b-NPF6)-1 | C, H, F | | | | 49.68% | 4.12% | 12.25% | | 80% | 9% | 91% |
| Poly(C2-b-NPF6)-2 | C, H, F | | | | 48.02% | 4.45% | 3.05% | 20% | 95% | 2% | 98% |

EXAMPLE 9

This example demonstrates the synthesis and properties of another copolymer Poly(C3-b-NPF6) in accordance with an embodiment of the invention.

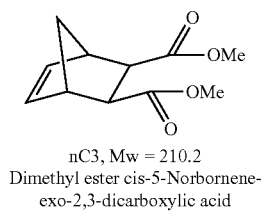

nC3, Mw = 210.2
Dimethyl ester cis-5-Norbornene-
exo-2,3-dicarboxylic acid

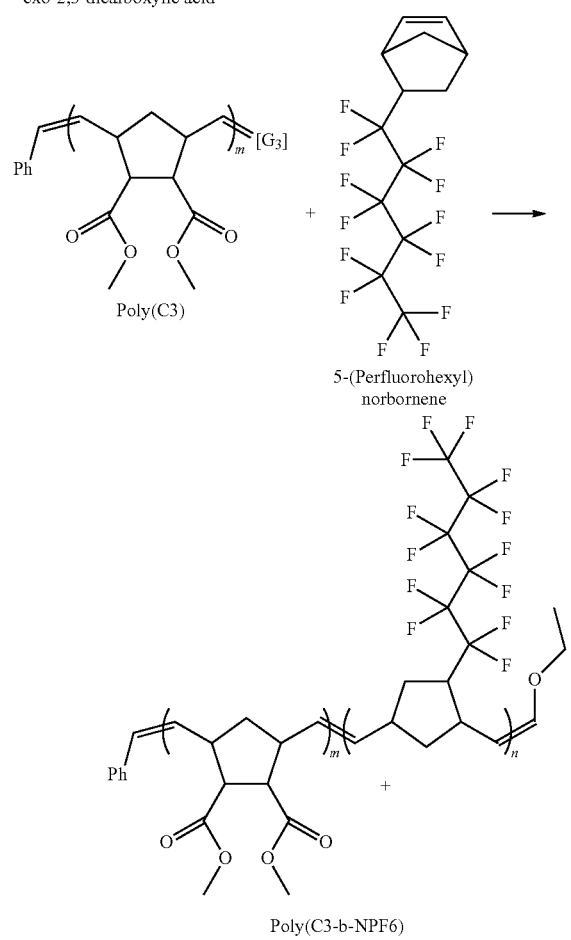

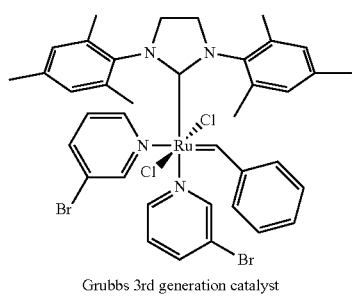

Grubbs 3rd generation catalyst

Grubbs $3^{rd}$ generation (G3) catalyst (11 mg, 0.012 mmol) was weighed in 40 mL vial with equipped with fluoropolymer resin-silicone septa open-top cap. G3 was dissolved in Argon degassed THF (60 mL) and transferred via cannula to clean 1 L RBF equipped with stirring bar. A solution of the C3 monomer (2.5 g, 12 mmol) in THF (86 mL) was degassed with Argon gas and transferred into the G3 solution and shirred for 30 minutes. A solution of the NPF6 monomer (0.86 g, 2.0 mmol) in THF (208 mL) was degassed with Argon gas and transferred into the growing Poly(C3) block solution and was stirred for another 60 minutes. Ethylvinylether (2 mL) was then added to the yellow solution of the diblock copolymer to terminate the reaction. The polymer was then precipitated in MeOH (2 L, 2×) to recover the white solid of pure polymer. The resulting polymer was filtered and dried under vacuum at room temperature, yield (3.0 g, 90%).

The $^1$H NMR data are set forth below and the elemental analysis is set forth in Table 2. $^1$H-NMR (300 MHz, CDCl3): δ (ppm) 5.7 to 5.2 (s broad), 3.7 to 3.5 (m broad), 3.3 to 2.8 (m broad), 2.5 to 1.75 (m broad), 1.6 (s broad), 1.25 (s broad).

TABLE 2

Elemental Analysis of Poly(C3-b-NPF6)

| Polymer Acronym | Material ID | Elemental Analysis | Actual (w %) | | | F-block w % | Hydrophilic w % | Mole % F-block % | Hydrophilic % |
|---|---|---|---|---|---|---|---|---|---|
| | | | C % | H % | F % | | | | |
| Poly(C3-b-NPF6) | KA-N4P10-1 | C, H, F | 56.19% | 5.67% | 14.88% | 25% | 75% | 14% | 86% |

EXAMPLE 10

This example demonstrates the synthesis and properties of yet another copolymer in accordance with an embodiment of the invention.

Poly(C4-b-NPF6) was synthesized as follows. Grubbs $3^{rd}$ generation (G3) catalyst (25 mg, 0.028 mmol) is weighed in 40 mL vial with equipped with fluoropolymer resin-silicone septa open-top cap. G3 was dissolved in Argon degassed THF (60 mL) and transferred via cannula to clean 1 L RBF equipped with stirring bar. A solution of C4 monomer (2.5 g, 11.8 mmol) in THF (86 mL) was degassed with Argon gas and transferred into the G3 solution and shirred for 30 minutes. A solution of NPF6 monomer (0.86 g, 2.0 mmol) in THF (208 mL) was degassed with Argon gas and transferred into the growing Poly(C4) block solution and is stirred for another 60 minutes. Ethylvinylether (2 mL) was then added to the yellow solution of the diblock copolymer to terminate the reaction. The polymer was precipitated in MeOH (2 L, 2×) to recover the white solid of pure polymer. The polymer was filtered and dried under vacuum at room temperature, yield (3.0 g, 90%).

$^1$H-NMR (300 MHz, CDCl3): δ (ppm) 6.85 (s broad), 5.8 (s broad), 5.6 (s broad), 5.2 to 4.9 (s broad), 4.8 to 4.5 (s broad), 4.4 to 4.0 (m broad) 4.0 to 3.6 (m broad) 3.2 to 2.9 (m broad), 1.4 to 1.2 (m broad).

The GPC trace of the copolymer in $CH_2Cl_2$ is shown in FIG. 3. The copolymer had the following properties: Mn=98800, Mw=127200, PDI=1.28.

EXAMPLE 11

This example demonstrates the synthesis and properties of a further copolymer in accordance with an embodiment of the invention.

Poly(C2 diacid-b-NPF6): Poly(C2-b-NPF6) was reacted with 0.1N NaOH solution to obtain Poly(C2 diacid-b-NPF6). Poly(C2-b-NPF6) diblock copolymer was dissolved in THF (1% mass) to form homogenous solution. The polymer solution was treated with 0.1N NaOH solution in water. The mixture was stirred at ambient temperature for 1 h followed by precipitation in hexane.

$^1$H-NMR (300 MHz, CDCl3): δ (ppm) 14 to 13 (s broad), 6.0 to 5.5 (m broad), 5.3 to 4.75 (s broad), 5.375 to 4.25 (s broad) 3.25 (s broad), 3.3 (s broad), 3.1 (s broad).

The polymer was coated on a porous PTFE support and its CWST was measured. The results obtained are set forth in Table 3.

EXAMPLE 12

This example demonstrates the synthesis and properties of a still further copolymer Poly(C3-r-NPF6) in accordance with an embodiment of the invention.

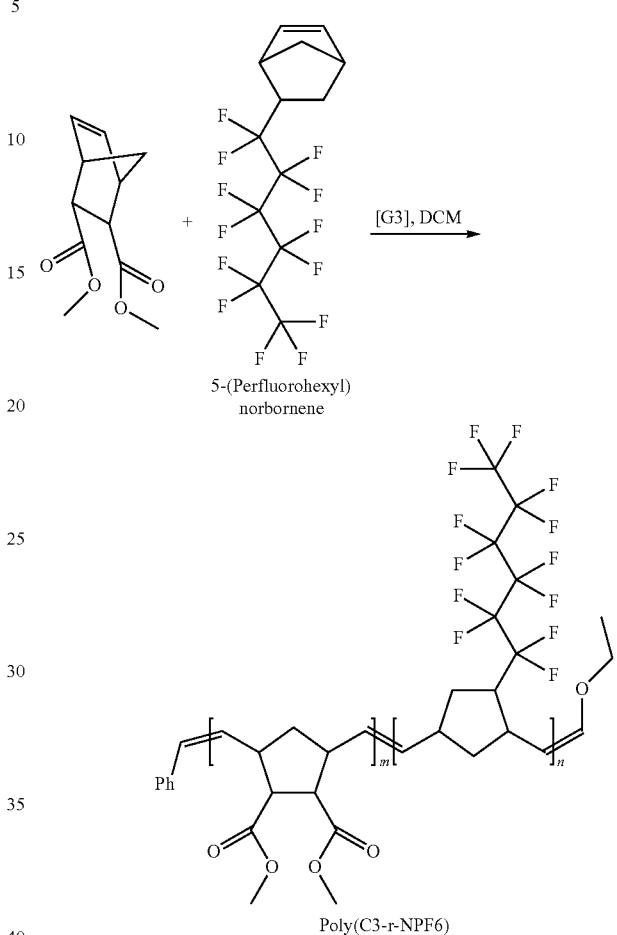

Grubbs 3rd generation (G3) catalyst (11 mg, 0.012 mmol) was weighed in 40 mL vial with equipped with fluoropolymer resin-silicone septa open-top cap. G3 was dissolved in Argon degassed DCM (20 mL) and transferred via cannula to clean 250 ml RBF equipped with stirring bar. A solution

TABLE 3

Results of CWST measurements

| Description | CWST 1 | Post Treatment | CWST 2 | AVG WF Norm Flow (L/min/ft^2/psid) | Post Sulfuric Acid Treatment CWST 3 | Post Peroxide Treatment CWST 4 | SPM CWST 5 |
|---|---|---|---|---|---|---|---|
| Native PTFE | 25.4 | NA | NA | 1.00 | NA | NA | NA |
| KA-N3P72- | 33.41 | NaOH | 72 | 0.28 | NA | NA | NA |
| Poly-(C2-b-NPF6)-1 - | 33.41 | | 72 | NA | NA | NA | NA |
| | | | 72 | NA | 42.9 | 46.41 | NA |
| 2.5% IN THF Jan. 29, 2014 Heat Curing | 33.41 | NaOH - Bleach | 72 | NA | 46.41 | 33.41 | 42.9 |
| KA-N3P72- | 33.41 | NaOH | 72 | NA | NA | NA | NA |
| Poly-(C2-b-NPF6)-1 - 2.5% IN THF Jan. 29, 2014 (Air Dry) | | NaOH - DI wash | 72 | 0.13 | 68.15 | 74.89 | NA | of C3 monomer (2.5 g, 12 mmol) and NYF6 (0.86 g, 2.0 mmol) mixture dissolved in DCM (90 ml) was degassed with Argon gas and transferred into the G3 solution and shined for 12 hours at room temperature. Ethylvinylether (2 mL) was then added to the yellow solution of the random copolymer to terminate the reaction. The polymer was then passed through a column of basic alumina, silica gel, and Celite to remove the catalyst. The solvent was removed in a rotary evaporator and the resulting polymer was colorless and highly viscous; yield (3.0 g, 90%).

1H-NMR (300 MHz, CDCl3): δ (ppm) 6.0 to 5.0 (s broad), 3.7 to 3.5 (m broad), 3.3 to 2.8 (m broad), 2.5 to 1.75 (m broad), 1.6 (s broad), 1.25 (s broad).

EXAMPLE 13

This example illustrates a method of preparing a hydrophilic porous PTFE membrane in accordance with an embodiment of the invention.

PTFE resin powder, FLUON CD123, was mixed with a 2.5% by weight solution of the copolymer Poly(C2-b-NPF6) in isopropanol solvent, to obtain a blend containing 5% of the Poly(C2-b-NPF6) in PTFE resin. The blend was mixed with 18 phr of lubricant Isopar G, and the resulting paste was mixed in a twin roller. The blend was formed into a billet by applying a pressure of 300 psi, at least twice, each for a period of about 55 sec. The resulting billets were equilibrated at room temperature for about 12 hrs. The billets were then extruded through a 26 mm die at the maximum pressure and constant temperature of 55° C., resulting in a tube-shaped PTFE tape. The tube-shaped tape was cut open along the central axis (along its length) and rolled around a pipette, resulting in a new billet (non-compressed). The new billet was extruded at the same conditions as used during the first extrusion process. Calendaring was performed at 30° C. targeting a tape thickness of 9-10 mils and cut into 4×4". The resulting tape was dried at 125° C. for 1 h, whereby the lubricant was removed from the tape. The tape was stretched in the machine direction and the transverse direction with a MD/TD ratio of 3 at a stretch rate of 300%/sec. The temperature of the stretch oven was set at 150° C. The resulting membrane was annealed in an annealing oven at 350° C. for 5 sec. FIG. 1A depicts an SEM micrograph of the membrane surface before stretching and FIG. 2A depicts an SEM micrograph of the membrane surface after stretching. The magnification is 10,000× in both the micrographs. The stretched membrane reveals the presence of increased number of interconnecting fibrils between PTFE domains.

Samples of the annealed membrane were exposed to 1N NaOH solution for a period of 60 min, followed by washing with DI water. Contact angle was measured on the membranes. The results obtained are set forth in Table 4.

TABLE 4

Contact Angles of PTFE samples

| Sample ID | Contact Angle (degree) |
|---|---|
| Poly(C2-b-NPF6) coated on PTFE | 101 |
| Poly(C2-b-NPF6) blend with PTFE | 113 |
| Control PTFE | 130 |

When a sample of the membrane prepared from Poly(C2-b-NPF6) blend with PTFE was placed on water in a jar, it was wetted by water, and descended to the bottom of the jar, confirming its hydrophilicity and wettability. On the other hand, the control PTFE membrane, when placed on water, simply floated, as it was not wetted by water.

EXAMPLE 14

This example illustrates a method of chemically modifying the hydrophilic porous PTFE membrane in accordance with an embodiment of the invention.

The PTFE membrane prepared as in Example 13, but without the exposure to NaOH solution, was exposed to JEFFAMINE M1000 or JEFFAMINE ED176 solution. The resulting membranes were washed and dried and tested for their CWST, and the results obtained are set forth in Table 5. Ring opening chemical modification increased the CWST.

TABLE 5

CWST values of post-modified PTFE membranes

| Chemical modification by ring opening | Chemistry as Blend |
|---|---|
| | Blend of Wetting Chemistry Resin As stretched = 31 Dynes/cm$^2$ Hot water 80° C. for 1 hr = 31 Dynes/cm$^2$ Ring opening = 33-35 Dynes/cm$^2$ |
| Ring opening example on blend media | CWST (Dynes/cm$^2$) |
| Stretch media before ring opening | ~31 |
| 5% JEFFAMINE M1000 treatment | 33.2-35.34 |
| 10% JEFFAMINE M1000 treatment | 33.2-35.34 |
| 5% JEFFAMINE ED176 treatment | 31.1-33.2 |
| 10% JEFFAMINE ED176 treatment | 31.1-33.2 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hydrophilic porous membrane comprising a blend of polytetrafluoroethylene (PTFE) and an amphiphilic copolymer, wherein the amphiphilic copolymer comprises repeat units A and B, wherein A is selected from one or more of the following structures:

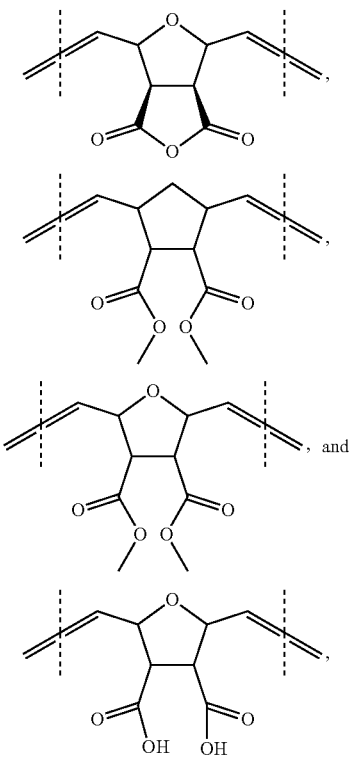

and B is of the formula:

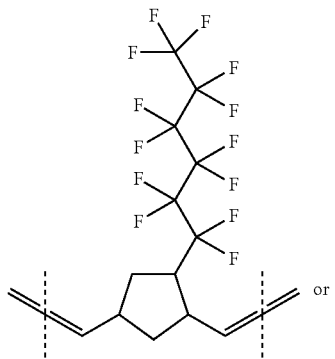

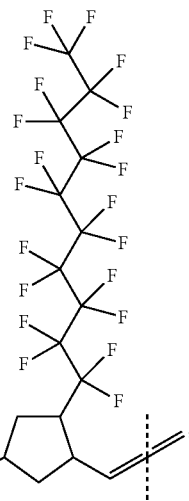

wherein:

the amphiphilic copolymer is a block copolymer or a random copolymer; and the number of repeat units of each of A and B are m and n, and range from 1 to about 1000, provided the sum of n and m is equal to or greater than 10.

2. The hydrophilic porous membrane of claim 1, wherein the amphiphilic copolymer has chain end groups selected from aryl groups and alkoxy groups.

3. The hydrophilic porous membrane of claim 1, wherein the amphiphilic copolymer is of one of the following formulae:

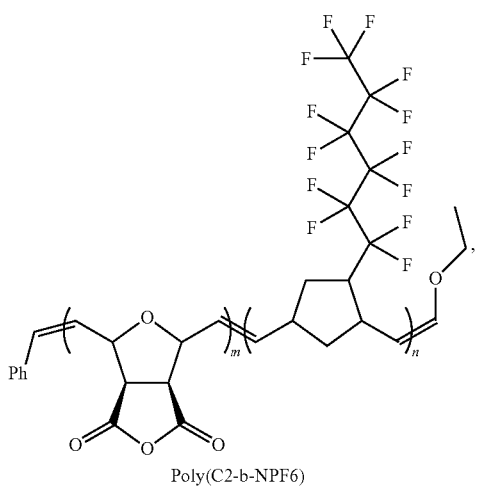

Poly(C2-b-NPF6)

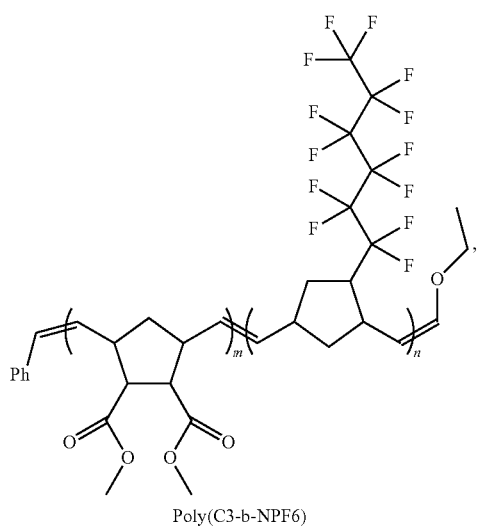

Poly(C3-b-NPF6)

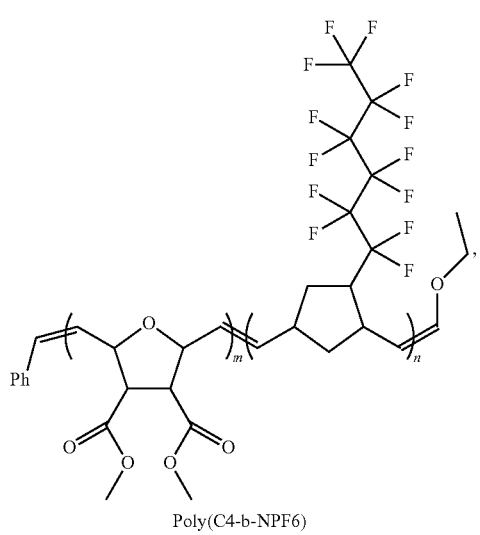

Poly(C4-b-NPF6)

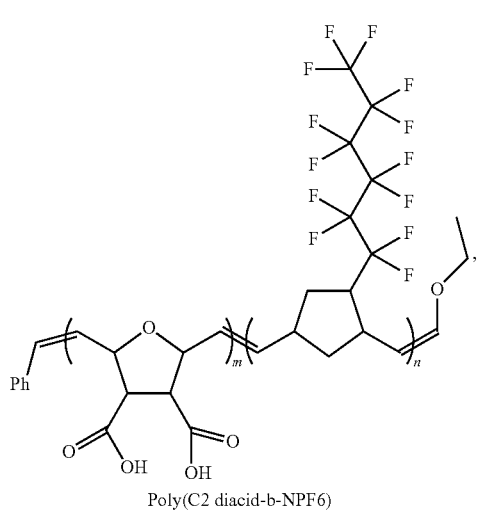

Poly(C2 diacid-b-NPF6)

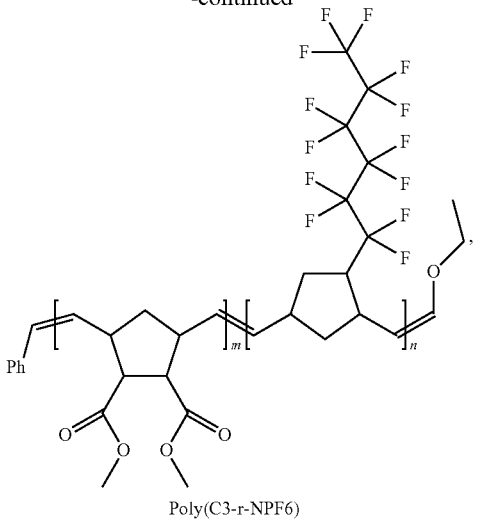

Poly(C3-r-NPF6)

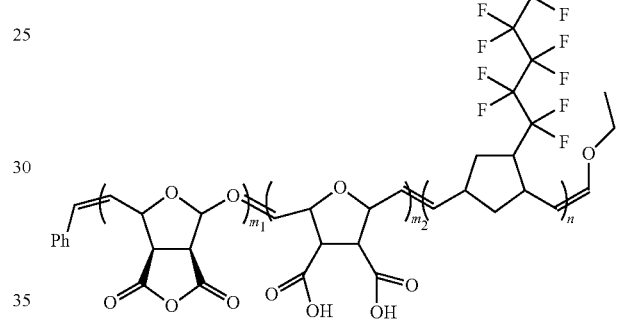

wherein $m_1+m_2=m$.

4. A method of preparing a hydrophilic porous membrane comprising:
  (i) preparing a blend comprising PTFE and an amphiphilic copolymer, optionally with a lubricant;
  (ii) extruding the blend into a tape;
  (iii) biaxially stretching the tape to obtain the hydrophilic porous membrane; optionally
  (iv) reacting the hydrophilic porous membrane with an agent to modify the chemical structure of the copolymer; and optionally
  (v) annealing the hydrophilic porous membrane;
  wherein the amphiphilic copolymer comprises repeat units A and B, wherein A is selected from one or more of the following structures:

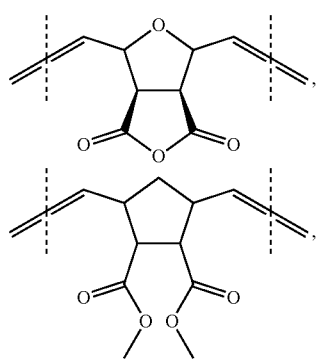

-continued

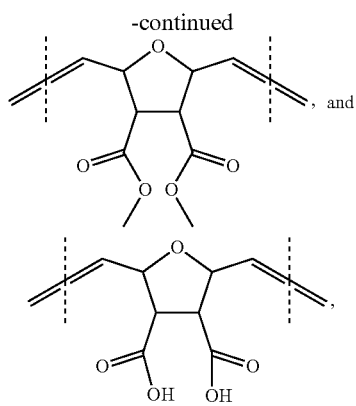
, and and B is of the formula:

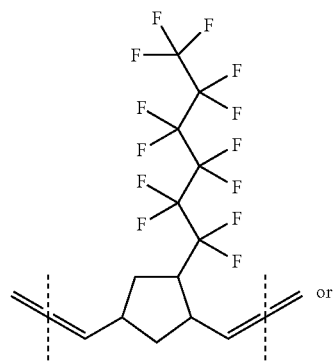
or

-continued

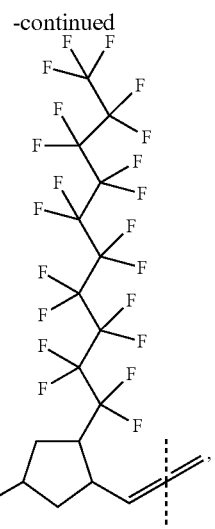
, wherein:
the amphiphilic copolymer is a block copolymer or a random copolymer; and
the number of repeat units of each of A and B are m and n, and range from 1 to about 1000, provided the sum of n and m is equal to or greater than 10.

5. The method of claim 4, wherein the agent in (iv) is a base.

6. A hydrophilic porous membrane prepared by the method of claim 4.

7. A hydrophilic porous membrane prepared by the method of claim 5.

* * * * *